(No Model.)
C. BAZUS.
MAT FOR FERMENTING VATS.
No. 434,014. Patented Aug. 12, 1890.
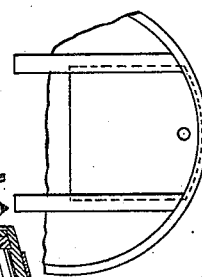
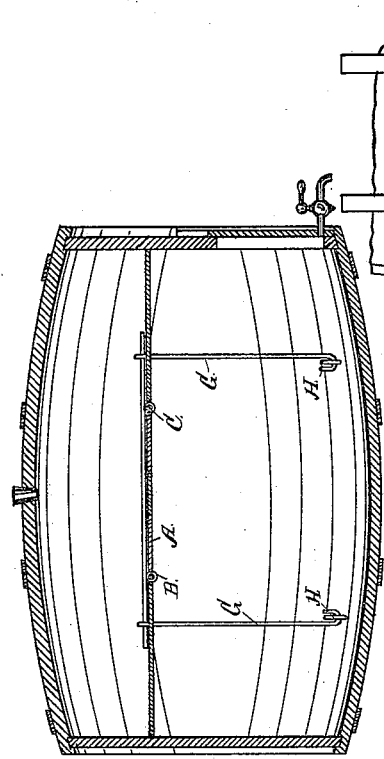
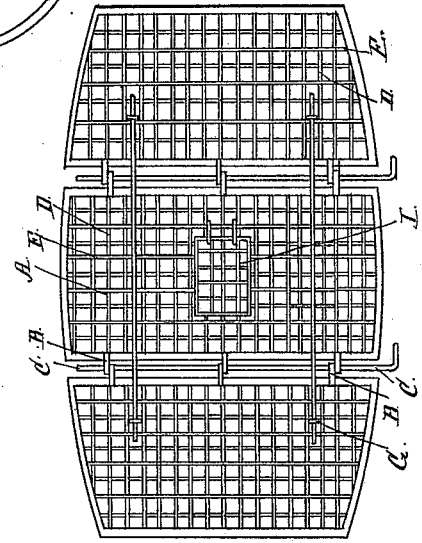
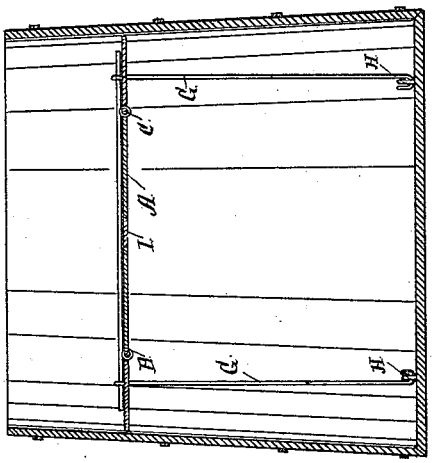
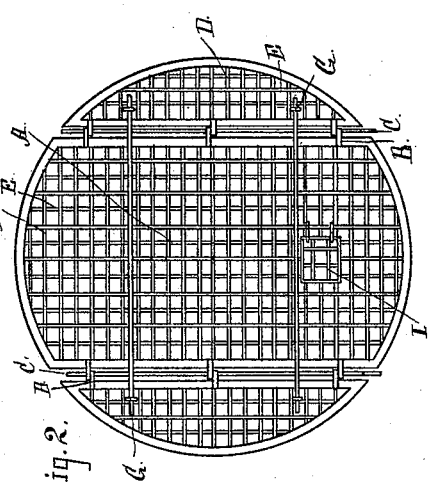
Witnesses:
Inventor:

UNITED STATES PATENT OFFICE.

CISER BAZUS, OF SAN FRANCISCO, CALIFORNIA.

MAT FOR FERMENTING-VATS.

SPECIFICATION forming part of Letters Patent No. 434,014, dated August 12, 1890.

Application filed July 24, 1888. Serial No. 280,930. (No model.)

*To all whom it may concern:*

Be it known that I, CISER BAZUS, a citizen of the Republic of France, residing in the city and county of San Francisco, and State of California, have invented a new and useful Mat for Fermenting-Vats, of which the following is a specification.

My invention relates to the fermentation of wines, and more especially to that class of wines known as "red wines," directly from the product of the crusher or press; and it has for its object the production of a device to keep the murk or solid refuse matter down beneath the surface of the must or liquid in the fermenting tank or cask, whereby the operation or process of fermentation is greatly benefited and the quality of the product improved in several respects.

In such processes of fermentation, as is well known, the skins and other solid refuse from the press are put into the fermenting-tank with the must or juice, and in the course of the operation I find that by keeping the solid matter down below the surface and allowing the liquid to stand above it I secure and produce several advantages and beneficial results. Among these I prevent too rapid fermentation, preserve the aroma, extract the coloring-matter from the skins, prevent acidity, and facilitate the conversion of the sugar into alcohol.

To such ends and purpose my invention consists, essentially, of an open-meshed mat or diaphragm having perforations, interstices, or apertures of suitable character to permit the liquid to pass through, but to keep back the solid particles when the mat is placed in position in the fermenting-tank. By means of rods or cords attached to the under side of the mat and eyebolts fixed in the bottom of the tank it is anchored in horizontal position at suitable distance above the bottom to leave room at the top part of the tank for the fermenting operation. An opening closed by a wicket is provided in the mat to admit the solid matter into the tank-space beneath the mat, and to permit the introduction of this device into a cask or similar receptacle I make it in sections of suitable size to be passed in through an opening cut for the purpose in the head of the cask and fitted with a slide or gate to close it. Suitable apertures for vent and for drawing off the contents are also provided, all of which features, together with their details of construction, are fully explained in the following description.

In the accompanying drawings, herein referred to, Figure 1 is a vertical section through a tank in which my device is arranged for use. Fig. 2 is a sectional view through a cask in which my device is fixed. Fig. 3 is a plan or top view of the device adapted for use in a tank or vat. Fig. 4 represents a form of the same suitable for a cask or barrel. Fig. 5 is a part end view of the cask, showing the opening for inserting the mat and the draw-off aperture at the bottom.

The same letters of reference denote corresponding parts wherever they occur in all the figures of the drawings.

The mat A is of suitably light construction to float or have a degree of buoyancy in the liquid, and is preferably made of some light material, as rattan; but it can be made also of strands of wire woven together, or of light bars of wood, or of fibrous material, as cords woven or knotted together and held in shape by a stiff rim or frame.

The openings or interstices in the body of the mat require to be of suitable size to let the liquid pass freely through, but to keep down the murk or solid matter, and in constructing it I am governed accordingly.

By making the mat in sections of convenient size, as represented more particularly in Figs. 3 and 4 of the drawings, it can be inserted into a cask or barrel, where such form of receptacle is employed, the sections being provided with slip-hinges—such as hooks—on one section and eyes on the other, or by means of knuckles on the adjoinining sides of two sections and a rod slipped through from one end, as shown in Fig. 4 of the drawings, the parts can be secured together and kept flat. These hinges and rods are seen at B B and C C, respectively.

The frame of the mat is composed of the rods D D E E. To the under side of the frame is attached the rods G G, having hooked ends to take rings or eyes H H, that are fixed in the bottom of the fermenting-vessel, by means of which the mat is anchored and held at suitable height in the liquid.

The mat should conform closely to the shape of the tank, cask, or other vessel in which it is placed, and in practice it should be anchored to stand from eight to twelve inches below the surface of the liquid, or to have about that amount of submergence in the liquid. When thus placed for operation, the material consisting of the murk or solid refuse, as well as the juices, is introduced from above, and by means of an opening provided with a wicket I this material is admitted below the mat, after which the opening is closed. This is readily done by carrying the matter as it comes from the press through a closed conductor introduced at the bung-hole or aperture in the top of the fermenting-receptacle and into the opening in the mat. In this manner the juice will fill and rise into the upper part of the receptacle comparatively free from the murk. The wicket is closed by reaching it through the aperture J in the top of the receptacle, and this opening is then closed and fermentation allowed to proceed. Suitable vent for gases arising in the process is provided, and the wine is drawn off through an outlet below the mat.

Having thus fully described my invention, what I claim, and desire to secure by Letters Patent, is—

1. A mat for fermenting-vats composed of open-mesh woven material, in combination with a wine-containing vessel and anchors for securing the matter in the vessel, as set forth.

2. The combination, with a wine-containing vessel, of anchors therein, and an open-mesh woven mat formed in hinged sections, having a removable rod holding the sections rigid and secured to the anchors by which it is retained in the vessel.

In testimony that I claim the foregoing I have hereunto set my hand and seal.

CISER BAZUS. [L. S.]

Witnesses:
C. W. M. SMITH,
CAMILLE V. GIRY.